(12) United States Patent
Cappiello

(10) Patent No.: US 6,294,778 B1
(45) Date of Patent: Sep. 25, 2001

(54) METHOD AND APPARATUS FOR RECORDING A FLAT FIELD IMAGE

(75) Inventor: Gregory G. Cappiello, Lexington, MA (US)

(73) Assignee: ECRM, Inc., Tewksbury, MA (US)

( * ) Notice: Subject to any disclaimer, the term of this patent is extended or adjusted under 35 U.S.C. 154(b) by 0 days.

(21) Appl. No.: 09/296,822

(22) Filed: Apr. 22, 1999

(51) Int. Cl.[7] .................................................. H01S 3/14
(52) U.S. Cl. ...................... 250/234; 250/216; 346/108; 359/206
(58) Field of Search ............................... 250/216, 226, 250/234–236; 359/206; 346/108

(56) References Cited

U.S. PATENT DOCUMENTS

| | | |
|---|---|---|
| 4,610,536 * | 9/1986 | Smyth et al. ........................ 355/38 |
| 4,803,497 | 2/1989 | Kennedy, Jr. et al. . |
| 4,863,250 | 9/1989 | Ishizuka . |
| 4,932,734 | 6/1990 | Sakuma et al. . |
| 4,982,206 * | 1/1991 | Kessler et al. ........................ 346/108 |
| 5,062,679 | 11/1991 | Itabashi . |
| 5,111,219 | 5/1992 | Makino . |
| 5,136,418 | 8/1992 | Itabashi . |
| 5,247,385 | 9/1993 | Takanashi . |
| 5,270,851 | 12/1993 | Makino et al. . |
| 5,557,315 * | 9/1996 | Meyers et al. ........................ 347/244 |
| 5,631,763 | 5/1997 | Park . |
| 5,657,146 | 8/1997 | Choi et al. . |
| 5,694,251 | 12/1997 | Shimada et al. . |
| 5,835,280 | 11/1998 | Griffith . |
| 6,084,706 * | 7/2000 | Tamkin et al. ........................ 359/366 |

FOREIGN PATENT DOCUMENTS

| | | |
|---|---|---|
| 0341518 | 11/1989 | (EP) . |
| 0806691A2 | 11/1997 | (EP) . |

* cited by examiner

Primary Examiner—Stephone B. Allen
(74) Attorney, Agent, or Firm—Hale and Dorr LLP (57) ABSTRACT

The invention features a flat field image printing apparatus. The printing apparatus includes: a light source responsive to an image modulated signal and producing a image modulated light beam; a beam deflector supported for rotary motion to deflect the image modulated light beam onto an image recording medium in response to the rotary motion; and a lens assembly configured to convert the deflected image modulated light beam into an achromatic focused beam spot which moves repeatedly in a first scan direction and over a range of scan angles to provide a highly resolved printed image across the recording medium. In other aspects, the invention features a high-speed printing apparatus employing multiple light sources, and an achromatic f-theta lens for use in such printing apparati.

22 Claims, 6 Drawing Sheets

METHOD AND APPARATUS FOR RECORDING A FLAT FIELD IMAGE

BACKGROUND OF THE INVENTION

This invention relates to a method and apparatus for recording or reproducing a flat field image, and in particular, to an apparatus that provides a high-quality and high-resolution image substantially insensitive to variation in illumination wavelength over a broad wavelength range.

Some image printers use lasers, such as helium-neon lasers or semiconductor laser diodes to generate an image modulated light beam for recording or reproducing an image or text either by exposing a photosensitive material (e.g., a film, plate, or paper) or by photosensitive charging of an electrostatic recording device. Currently available semiconductor laser diodes are small, cost efficient, operate in the milliwatt range and can be readily modulated at rates up to 5 GHz by modulating its driving current, which is desirable for high resolution printing. In contrast, helium-neon lasers are relatively large, costly, and typical require expensive optical components to provide high-resolution printing. Thus, semiconductor laser diodes are preferred as the source of a modulated light beam for recording in high-resolution printing.

High-quality printing is achieved when optical aberrations yielding variations in focus spot size across the printed image are minimized. For example, chromatic aberrations cause different wavelengths of the light beam to focus at different points. Although semiconductor laser diodes produce predominantly monochromatic light beams, they can suffer from chromatic aberrations because of power output fluctuations and multiple longitudinal mode operation that change their output wavelengths. In such cases, the chromatic aberration can produce unwanted image variations at the photosensitive material.

SUMMARY OF THE INVENTION

In general, in one aspect, the invention features a flat field image printing apparatus. The printing apparatus includes: a light source responsive to an image modulated signal and producing an image modulated light beam; a beam deflector supported for rotary motion to deflect the image modulated light beam onto an image recording medium in response to the rotary motion; and a lens assembly configured to convert the deflected image modulated light beam into an achromatic focused beam spot which moves repeatedly in a first scan direction and over a range of scan angles to provide a highly resolved printed image across the recording medium.

In general, in another aspect, the invention features a high-speed flat field image printing apparatus. The high-speed printing apparatus includes: a plurality of light sources responsive to an image modulated signal and producing a plurality of image modulated light beams having a plurality of wavelengths; a beam deflector supported for rotary motion to deflect the plurality of image modulated light beams onto an image recording medium in response to the rotary motion; and a lens assembly configured to convert the plurality of deflected image modulated light beams into a plurality of achromatic focused beam spots which move repeatedly in a first scan direction and over a range of scan angles to provide a highly resolved printed image across the recording medium.

Embodiments of either the printing apparatus or the high-speed printing apparatus can include any of the following features. The range of scan angles can be −32° to +32°. The recording medium and the achromatic focused spot(s) can be configured to be translated relative one another in a second direction perpendicular to the first scan direction in order to print a two-dimensional image. The recording medium can include photosensitive film, plate, or paper. Alternatively, the recording medium can include an electrostatic recording device.

In addition, the lens assembly in the embodiments of either the printing apparatus or the high-speed printing apparatus can include any of the following features. The lens assembly can be configured to produce an achromatic focused beam spot in the visible and near infrared spectral wavelength range, e.g., the wavelength range of 670 nm to 780 nm. The lens assembly can include: a first lens having a negative power; a second lens having a positive power; and a third lens having a positive power, wherein the first, second and third lenses are arranged in the order from the object to the image side and satisfy the following formulae (1) to (6)

$$-3.6 < \phi_1 < -3.0 \qquad (1)$$

$$1.6 < \phi_2 < 2.0 \qquad (2)$$

$$1.5 < \phi_3 < 1.8 \qquad (3)$$

$$v_1 < 34 \qquad (4)$$

$$44 < v_2 < 61 \qquad (5)$$

$$37 < v_3 < 51 \qquad (6)$$

where $\phi_n$ is the power of the $n^{th}$ lens with respect to the total power of the lens assembly and $v_n$ represents the Abbe dispersion number of the nth lens. The lens assembly can include: a first lens having a negative power and a refractive index in the range of 1.64 to 1.85; a second lens having a positive power and a refractive index in the range of 1.60 to 1.75; and a third lens having a positive power and a refractive index in the range of 1.65 to 1.75, wherein the first, second and third lenses are arranged in the order from the object to the image side.

In general, in yet another embodiment, the invention features an f-theta lens assembly configured to convert an image modulated light beam into an achromatic focused beam spot which moves repeatedly in a first scan direction and over a range of scan angles to provide a highly resolved image. The lens assembly includes: a first lens having a negative power; a second lens having a positive power; and a third lens having a positive power, wherein the first, second and third lenses are arranged in the order from object to image side and satisfy the following formulae (1) to (6)

$$-3.6 < \phi_1 < -3.0 \qquad (1)$$

$$1.6 < \phi_2 < 2.0 \qquad (2)$$

$$1.5 < \phi_3 < 1.8 \qquad (3)$$

$$v_1 < 34 \qquad (4)$$

$$44 < v_2 < 61 \qquad (5)$$

$$37 < v_3 < 51 \qquad (6)$$

where $\phi_n$ is the power of the $n^{th}$ lens with respect to the total power of the lens assembly and $v_n$ represents the Abbe dispersion number of the $n^{th}$ lens.

Embodiments of the lens assembly can have any of the following features. The lens assembly can be configured to produce an achromatic focused beam spot in the visible and near infrared spectral wavelength range, e.g., the wavelength range of 670 nm to 780 nm. The range of scan angles can be −32° to +32°. The first lens can have a refractive index in the range of 1.64 to 1.85, the second lens can have a refractive index in the range of 1.60 to 1.75, and the third lens can have a refractive index in the range of 1.65 to 1.75.

The total optical power ø of a multi-component system is the reciprocal of its effective focal length at the primary design wavelength. The optical power $ø_n$ of the $n^{th}$ element of the multi component system equals the reciprocal of the focal length of the $n^{th}$ element at the primary design wavelength, divided by the total optical power ø of the multi-component system.

The Abbe dispersion number $v_d$ for a material is given by $v_d=(n_d-1)/(n_F-n_c)$, where $n_d$, $n_F$, are $n_c$ are the indices of refraction for the material at 587.5618 nm, 486.1327 nm, and 656.2725 nm, respectively. The Abbe dispersion number $v_n$ for the nth element of a multi component system is the Abbe dispersion number $v_d$ for the material of the $n^{th}$ element.

Among the advantages of the invention are the following. Because of the achromatic lens assembly, a new laser diode can replace an old laser diode in a printing apparatus without any optical realignment, even though the wavelength produced by the new laser diode may differ from that of the old diode by as much as 20 nm. Typically, laser diodes have a lifetime of about 50,000 hours and need to be replaced every 5 years. Absent the achromatic property of the lens assembly, the printing apparatus would need to be refocused and realigned by a trained operator every time a laser diode is replaced. The achromatic lens assembly, however, compensates for wavelength-dependent variations in focal size and position so that such refocusing and realignment is not necessary.

Furthermore, the achromatic lens assembly corrects for chromatic aberrations caused by the broadening of the laser line width. Such broadening can occur at low drive currents because the laser diode operates near its lasing threshold where the intensity of the laser line is low and the spectral line width is broad. Similarly, the achromatic lens assembly corrects for chromatic aberrations caused by the laser diode shifting to higher wavelengths. Such shifting can occur at high drive currents where the laser diode output is large. Additional chromatic aberrations compensated by the achromatic lens assembly include those caused by output power fluctuations in the laser diode caused by internal temperature variations and mode-hopping instabilities.

The achromatic lens assembly can also be used in high-speed printing systems that use multiple laser diodes to increase printing speed. Because the achromatic lens assembly compensates for chromatic aberrations, it is not necessary to match the wavelengths produced by the multiple laser diodes. In particular, the lens assembly allows multiple laser diodes in the same printing apparatus even though the laser diodes may have lot-to-lot variations in emission wavelength of several nanometers.

Furthermore, the achromatic lens assembly enables the printing system to expose photosensitive imaging media at different wavelengths without realigning and refocusing the system.

Other features and advantages of the invention will be apparent from the description of the preferred embodiments and from the claims.

DETAILED DESCRIPTION

Figure 1:
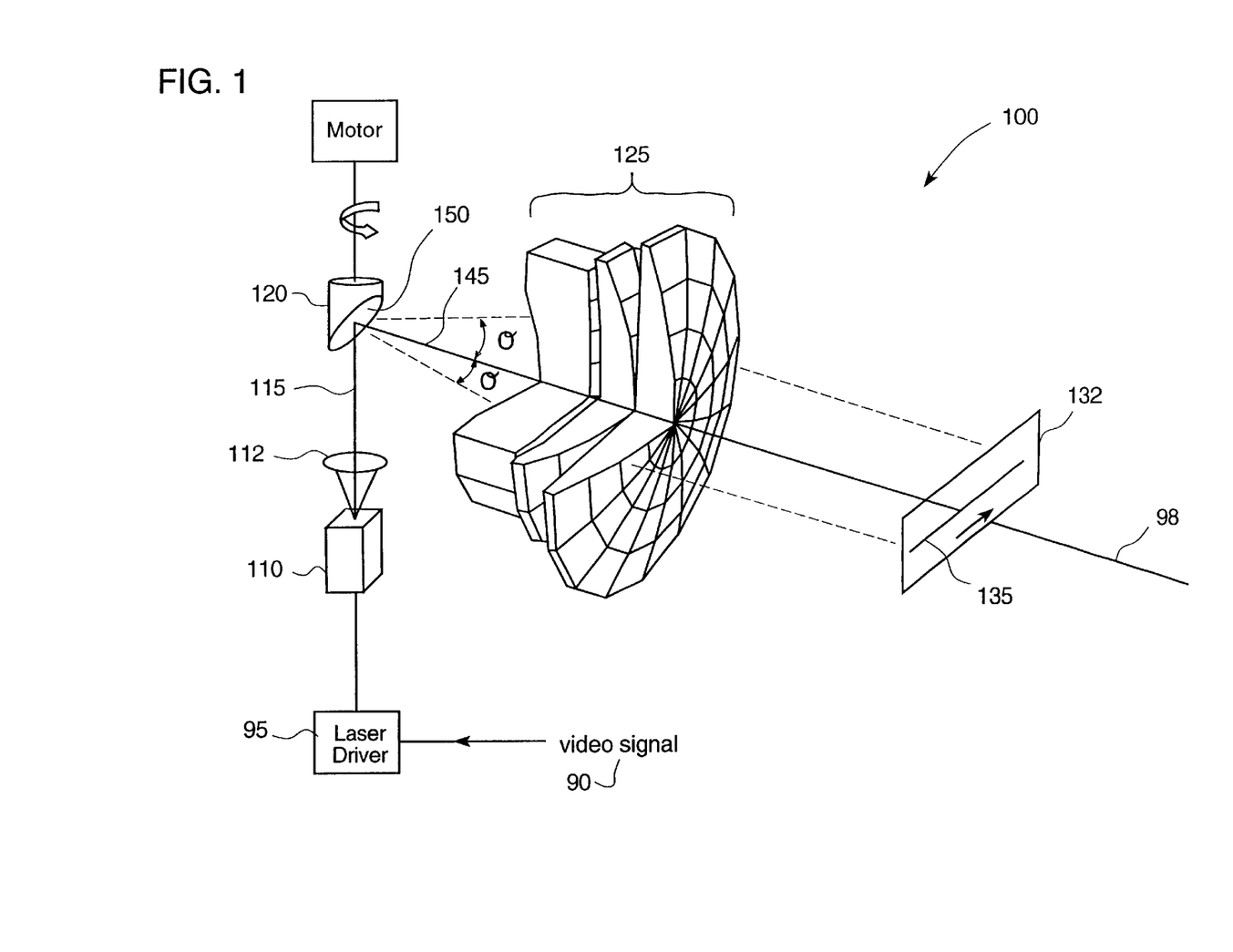
FIG. 1 is a schematic figure of a flat field image recording apparatus.

FIG. 1 schematically illustrates one embodiment of a flat field image recording apparatus 100. This flat field image recording apparatus provides a two-dimensional image on photosensitive material from an electrical signal, such as an externally applied video signal 90 of this image. Video signal 90 modulates a power source 95, which drives a light source 110. Light source 110 converts the externally applied video signal into an image modulated visible or infrared light output that is collimated by lens 112 to form an image modulated beam 115. The image modulated light beam 115 is deflected by a 45 degree rotatable mirror 120 towards a focusing lens system 125, which focuses the deflected light beam 145 into an image point on photosensitive material 132. A high-speed motor 142 drives rotatable mirror 120 about a rotation axis 140.

As mirror 120 is rotated, the beam passing through scan lens 125 causes a focused spot to move in a raster-like fashion along an imaging line 135 on material 132. The scan angles θ that are swept out during imaging by the mirror facet 150 span a range from approximately −32° to +32°. During this period, information contained in the deflected light beam 130 exposes photosensitive material 132 in a sweep or scan-like manner. To produce the sweeping action of the scan beam 130, motor 140 rotates the mirror 120 at a pre-determined angular velocity. For a high-resolution scan, the strip 135 is a very fine, for example, less than about ¹⁄₁₀₀₀ of an inch wide. To scan an image field rapidly with such fine scan-beams, the motor 140 typically turns the mirror 120 at a high frequency, for example, 20,000 revolutions per minute (RPM).

In the various embodiments, the incoming light beam 115 may be visible, infrared, or ultraviolet light and is generated by a laser, such as a helium neon laser or a semiconductor laser diode. Semiconductor laser diodes are preferred for high resolution printing because they are small, cost efficient, operate in the milliwatt range and can be readily modulated at rates up to 5 GHz by modulating its driving current, which is desirable for high resolution printing.

Scan lens 125 is constructed and arranged to focus beam 145 during scanning at all points along imaging line 135. In particular, lens 125 is an f-theta lens, i.e., it maintains the relationship Y=f×θ, where f is the effective focal length of the system, θ is the scan angle and Y is the distance of the imaged object along line 135 from the optical axis 98. The f-theta lens insures that the scanning speed of beam 130 across the flat image field on photosensitive material 132 is uniform for a constant angular velocity of rotatable mirror 120. To expose the second dimension of photosensitive material 132, it can be translated in a direction perpendicular to optical axis 98 and imaging line 135 using techniques known in the art such as a capstan roller or a flat bed. Alternatively, the focused beam itself can be translated perpendicular to imaging line 135 on photosensitive material 132 by translating the optical assembly directing beam 115 or by using another movable mirror positioned between scan lens 125 and photosensitive material 132 to redirect the beam.

Figure 2:
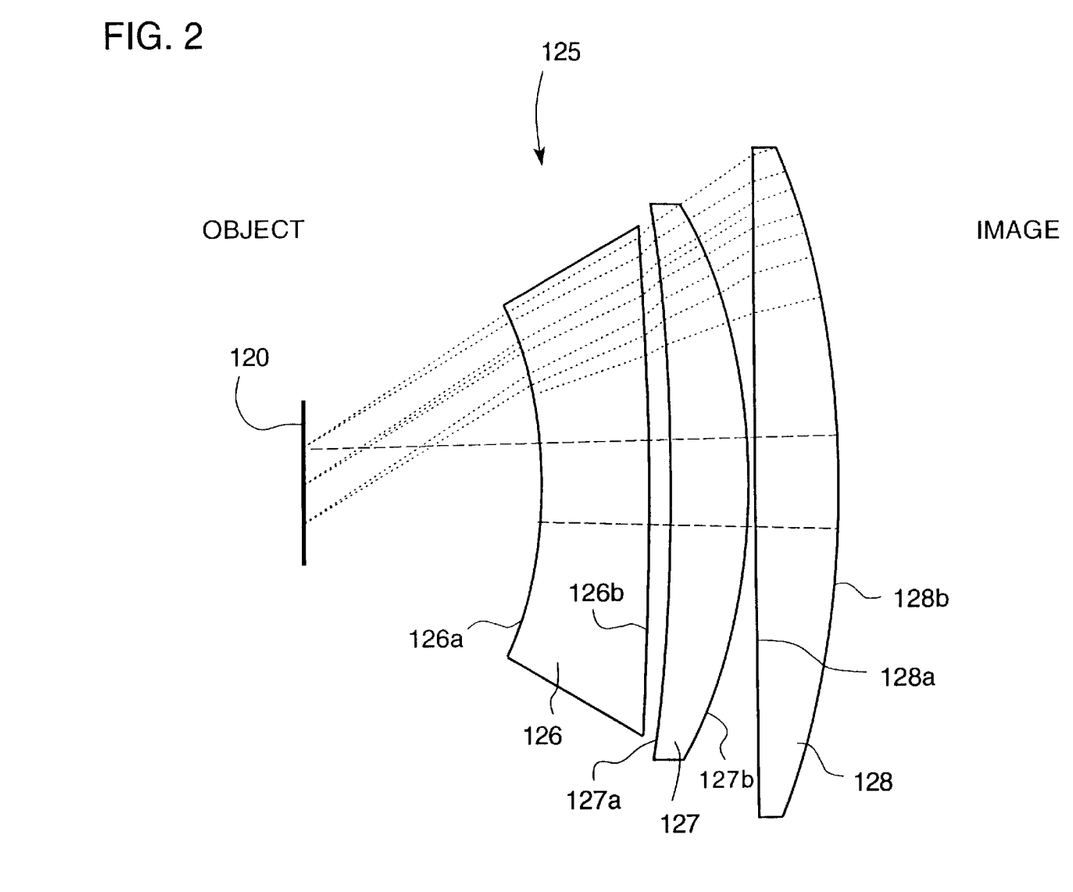
FIG. 2 is a schematic figure of the scan lens in the flat field recording apparatus of FIG. 1.

Referring to FIG. 2, scan lens 125 is an assembly of made of three individual lenses 126, 127 and 128. The first lens 126 has a negative power and includes a concave spherical face 126a on the object side and a convex spherical face 126b on the image side. The second lens 127 has a positive power and includes a concave spherical face 127a on the object side and a convex face 127b on the image side. The third lens 128 has a positive power and includes a flat face 128a on the object side and a convex spherical face 128b on the image side.

In one embodiment, the design wavelength is 670 nm, the total effective focal length for scan lens 125 is 494 mm, corresponding to total power ø of about 0.2 m$^{-1}$, and the normalized individual optical powers $ø_n$ for lenses 126, 127 and 128 are −3.026, 1.607, and 1.654, respectively. In addition, the Abbe dispersion number $v_n$ for lenses 126, 127, and 128 are 30.07, 60.32, and 44.72, respectively. Such parameters correct for chromatic aberrations over a range of illumination wavelengths of about 670 nm to 780 nm. The design of this embodiment is also scalable to other total effective focal lengths. In such cases, the normalized optical powers $ø_n$ and the Abbe dispersion numbers $v_n$ for individual lenses 126, 127 and 128 are unchanged from those values listed above. Table 1 summarizes the optical component data for such a design of scan lens 125.

TABLE 1

Lens Design scaled to a 100-mm focal length

| Lens # | Surface | Radius (mm) | Thickness (mm) | $n_d$ | $ø_n$ | $v_n$ |
|---|---|---|---|---|---|---|
|  | OBJECT | Infinity | Infinity |  |  |  |
|  | STOP | Infinity | 11.01454 |  |  |  |
| 1 | 2 | −20.03727 | 4.938993 | 1.69895 | −3.026 | 30.07 |
|  | 3 | −179.5637 | 1.012089 |  |  |  |
| 2 | 4 | −95.08931 | 3.64352 | 1.62041 | 1.607 | 60.32 |
|  | 5 | −27.74106 | 0.2024178 |  |  |  |
| 3 | 6 | Infinity | 3.845937 | 1.74400 | 1.654 | 44.72 |
|  | 7 | −44.58658 | 124.056 |  |  |  |
|  | Scanned surface | Infinity |  |  |  |  |

Referring to Table 1, lenses 1, 2 and 3 correspond to lenses 126, 127, and 128 in FIG. 2, respectively, and faces 2, 3, 4, 5, 6 and 7 correspond to surfaces 126a, 126b, 127a, 127b, 128a and 128b in FIG. 2, respectively. As described in the summary above, nd is the refractive index of each lens at 587.5618 nm, $ø_n$ is the optical power of the n$^{th}$ lens, and $v_n$ is the Abbe dispersion number of the nth lens. The values for radius of curvature and thickness in Table 1 are defined for a scan lens having a total effective focal length of 100 millimeters. For a different total effective focal length of F, the values for radius of curvature and thickness in Table 1 are multiplied by (F/100), where F is in mm. Furthermore, the thickness values for the aperture stop, and surfaces 3, 5, and 7 correspond to the air-space distances between rotatable mirror 120 and surface 126a, surfaces 126b and 127a, surfaces 127b and 128a, and surface 128b and photosensitive material 132, respectively. The lens design specified by Table 1 can have an F-number as small as 29 while providing diffraction-limited focusing for a total effective focal length of 494 mm over a scan angle range of −32° to +32°.

More generally, in other embodiments, scan lens 125 can have parameters different from those in Table 1. In particular, scan lens 125 can correct for chromatic aberrations in the visible to near infrared region when the following formulae (1) through (6) are satisfied:

$$-3.6 < ø_1 < -3.0 \quad (1)$$

$$1.6 < ø_2 < 2.0 \quad (2)$$

$$1.5 < ø_3 < 1.8 \quad (3)$$

$$v_1 < 34 \quad (4)$$

$$44 < v_2 < 61 \quad (5)$$

$$37 < v_3 < 51 \quad (6)$$

where again $ø_n$ is optical power of the n$^{th}$ lens element, which is normalized with respect to the total power ø of the lens system, and $v_n$ is the Abbe dispersion number of the nth lens element.

Figure 3:
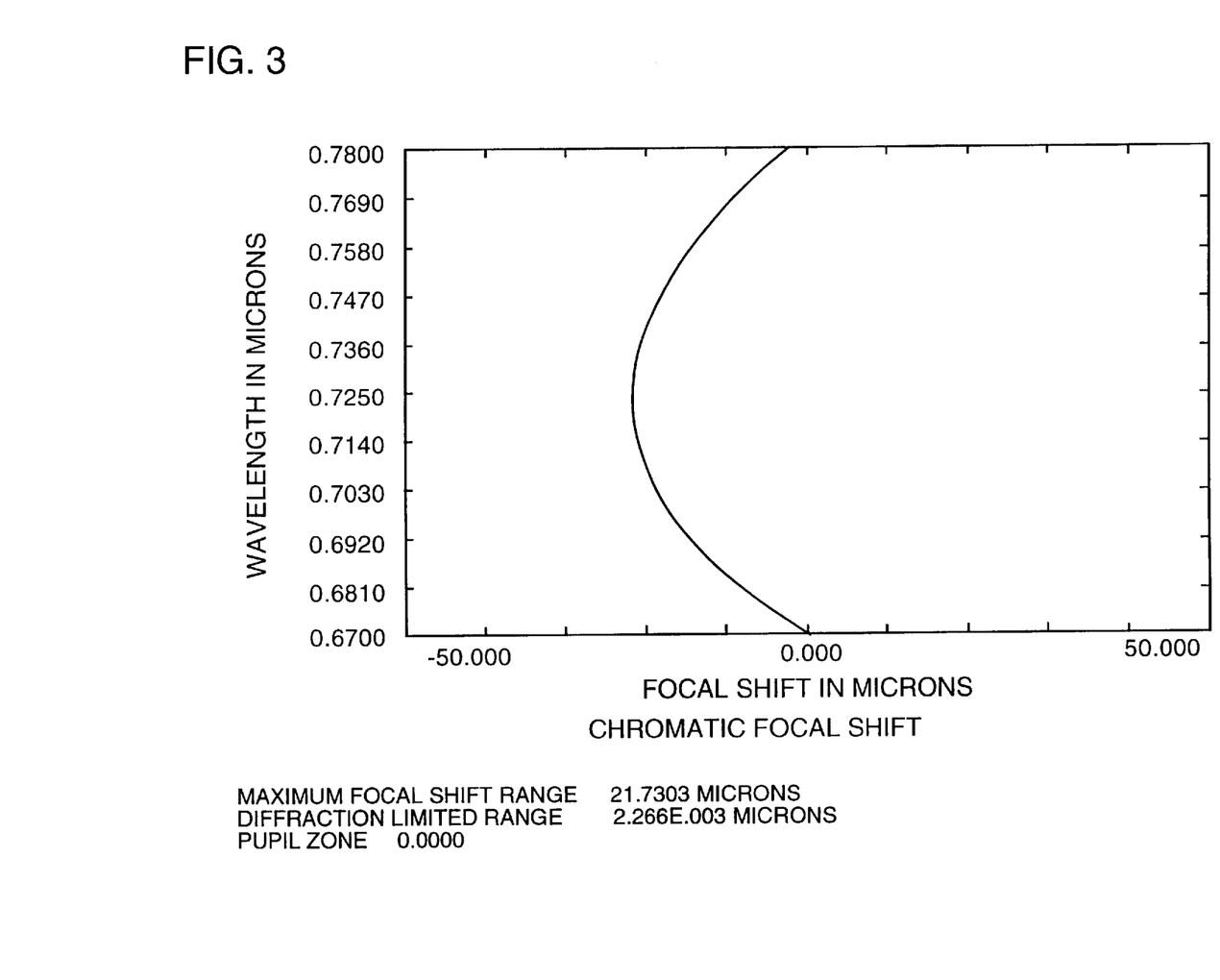
FIG. 3 is a graph of the axial chromatic focal shift of the scan lens of FIG. 2.

The axial chromatic focal shift of the lens system of Table 1 is shown in FIG. 3 assuming a total effective focal length F for the system of 100 mm. The total focal shift range over the entire wavelength range between 670 nm and 780 nm is less than 220 parts-per-million of F.

Figure 4:
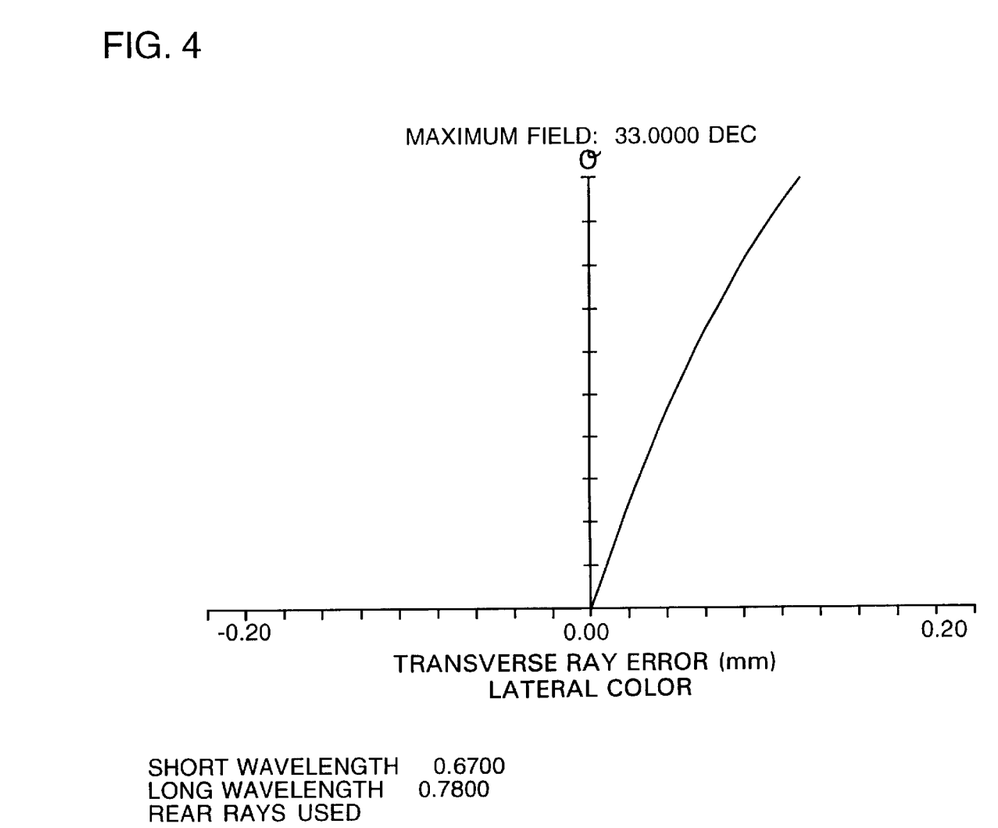
FIG. 4 is a graph of the lateral color plot of the scan lens of FIG. 2.

The lateral color plot, shown in FIG. 4, depicts the transverse ray error between a long wavelength of 780 nm and a short wavelength of 670 nm in the image plane versus field angle. The lateral color shift is about 1 part-per-thousand of F over a range of field angles up to 33 degrees.

Figure 5A:
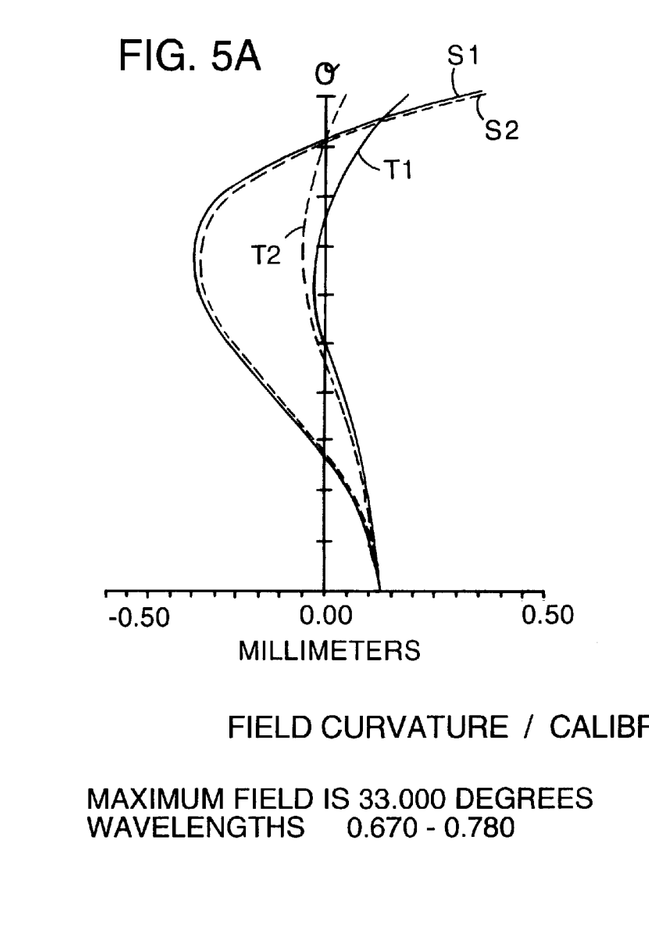
FIGS. 5A and 5B are graphs of the field curvature and f-theta distortion, respectively, for the scan lens of FIG. 2.
Figure 5B:
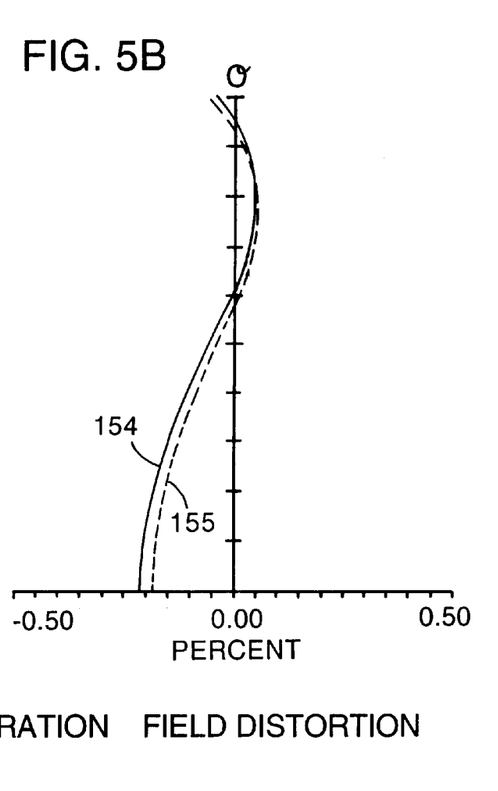

Referring to FIG. 5A, the field curvature plot depicts the location of the tangential T1, T2 and sagittal S1, S2 foci for wavelengths of 780 nm and 670 nm, respectively, plotted for a range of field angles up to 33 degrees. This plot shows the amount of curvature in the image plane, the amount of astigmatism over the entire field and an estimate of the maximum field angle for which the lens system possesses minimum distortion. FIG. 5B shows the f-theta distortion over a range of field angles up to 33 degrees for a wavelengths of 780 nm (curve 154) and 670 nm (curve 155). As indicated the distortion is less than about 0.2% over the range.

The achromatic scan lens described above can also be implemented in high-speed printing systems that are similar to the flat field image recording apparatus of FIG. 1 but further include multiple light sources. Such a recording apparatus 200 is shown, for example, in FIG. 6. An image-modulated video signal 290 is sent to a laser driver 295 that causes a laser diode array 210, including a plurality of laser diodes, to produce a plurality of image modulated beams 215. A series of collimating optics 212 including, e.g., spherical and cylindrical lenses, collimates beams 215 to form a parallel-propagating series of collimated beams 218 that contact a rotatable polygon mirror 220. A high-speed motor 242 drives rotatable mirror 220 about a rotation axis 240 to deflect the collimated beams 218 from a surface 250 of polygon mirror 220 over a range of scan angles θ towards scan lens 225. The orientations of diode array 210 and collimating optics 212 cause the series of collimated beams 218 to contact polygon mirror 220 along a line that is coplanar with rotation axis 240.

Figure 6:
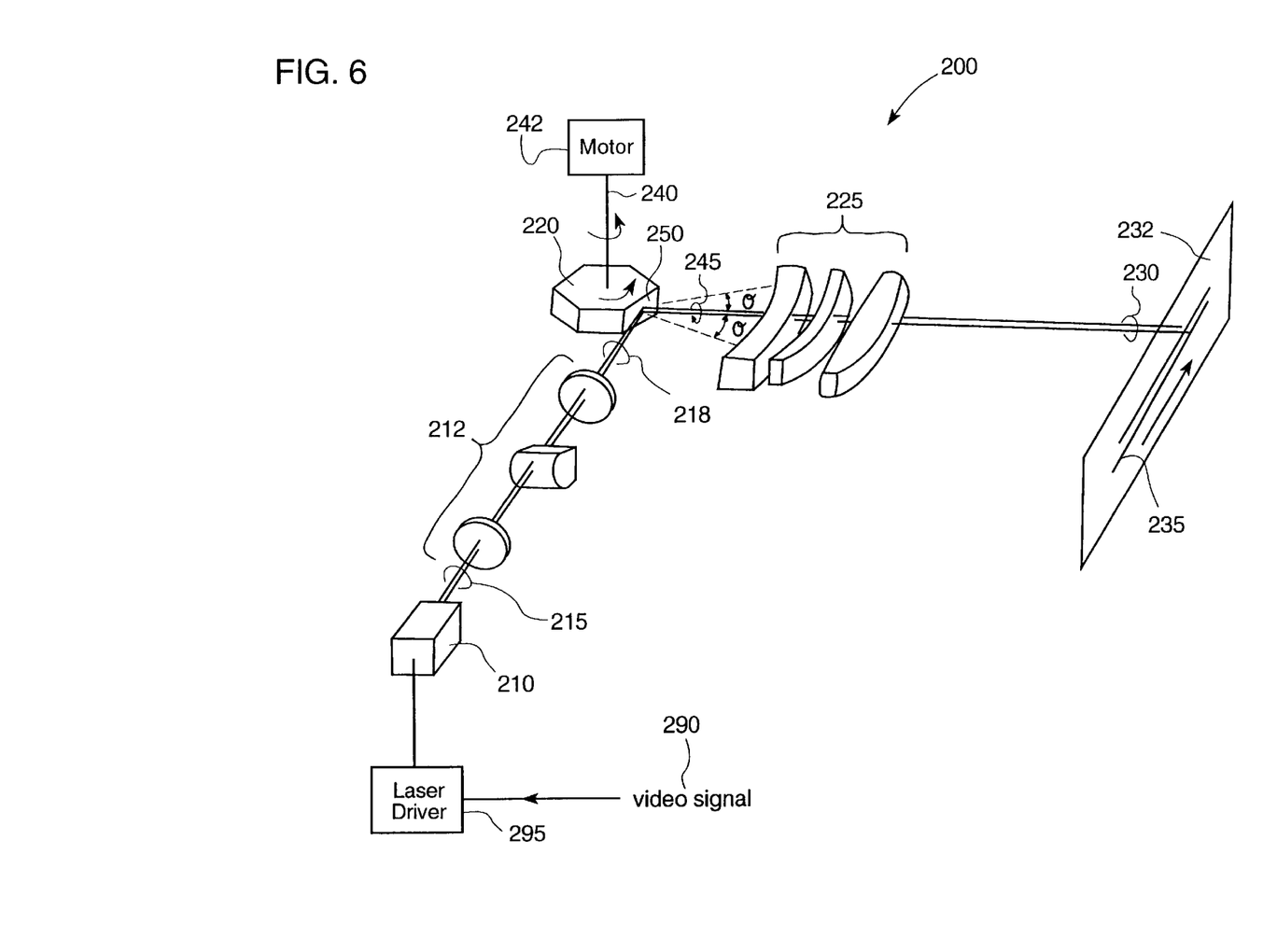
FIG. 6 is a schematic figure of a high-speed flat field image recording apparatus including multiple light sources and the scan lens of FIG. 2.

Scan lens 225 focuses each of the deflected series of beams 245 into a series of achromatic focused beams 230 incident on an image recording medium 232. As polygon mirror 220 rotates, the focused beams 230 raster across image recording medium 232 along directions parallel to scan line 235. Because the focus beams 230 span points along a direction perpendicular to scan line 235, they can more rapidly expose image recording medium 232 as it is translated perpendicular to scan line 235 to write a two-dimensional image.

Other aspects, advantages, and modifications are within the scope of the following claims.

What is claimed is:

1. A flat field image printing apparatus comprising:
   a light source responsive to an image modulated signal and producing an image modulated light beam;
   a beam deflector supported for rotary motion to deflect said image modulated light beam onto an image recording medium in response to said rotary motion; and
   a lens assembly configured to convert said deflected image modulated light beam into an achromatic focused beam spot which moves repeatedly in a first scan direction and over a range of scan angles to provide a highly resolved printed image across said recording medium.

2. The apparatus of claim 1 wherein said lens assembly is configured to produce an achromatic focused beam spot in the visible and near infrared spectral wavelength range.

3. The apparatus of claim 1 wherein said lens assembly is configured to produce an achromatic focused beam spot in the spectral wavelength range of 670 nm to 780 nm.

4. The apparatus of claim 1 wherein said range of scan angles spans −32° to +32°.

5. The apparatus of claim 1 wherein said recording medium and said achromatic focused beam are configured to be translated relative to one another in a second direction perpendicular to said first scan direction in order to print a two-dimensional image.

6. The apparatus of claim 5 wherein said recording medium comprises photosensitive film, plate, or paper.

7. The apparatus of claim 5 wherein said recording medium comprises an electrostatic recording device.

8. A flat field image printing apparatus comprising:
   a light source responsive to an image modulated signal and producing an image modulated light beam;
   a beam deflector supported for rotary motion to deflect said image modulated light beam onto an image recording medium in response to said rotary motion; and
   a lens assembly configured to convert said deflected image modulated light beam into an achromatic focused beam spot which moves repeatedly in a first scan direction and over a range of scan angles to provide a highly resolved printed image across said recording medium,
   wherein said lens assembly comprises
      a first lens having a negative power,
      a second lens having a positive power, and
      a third lens having a positive power,
         wherein said first, second and third lenses are arranged in the order from the object to tile image side and satisfy the following formulae (1) to (6)

$$-3.6 < \phi_1 < -3.0 \quad (1)$$
$$1.6 < \phi_2 < 2.0 \quad (2)$$
$$1.5 < \phi_3 < 1.8 \quad (3)$$
$$v_1 < 34 \quad (4)$$
$$44 < v_2 < 61 \quad (5)$$
$$37 < v_3 < 51 \quad (6)$$

where $\phi_n$ is the power of the $n^{th}$ lens with respect to the total power of the lens assembly and $v_n$ represents the Abbe dispersion number of the $n^{th}$ lens.

9. A flat field image printing apparatus comprising:
   a light source responsive to an image modulated signal and producing an image modulated light beam;
   a beam deflector supported for rotary motion to deflect said image modulated light beam onto an image recording medium in response to said rotary motion; and
   a lens assembly configured to convert said deflected image modulated light beam into an achromatic focused beam spot which moves repeatedly in a first scan direction and over a range of scan angles to provide a highly resolved printed image across said recording medium,
   wherein said lens assembly comprises
      a first lens having a negative power and a refractive index in the range of 1.64 to 1.85,
      a second lens having a positive power and a refractive index in the range of 1.60 to 1.75,
      a third lens having a positive power and a refractive index in the range of 1.65 to 1.75, and
         wherein said first, second and third lenses are arranged in the order from the object to the image side.

10. An f-theta lens assembly configured to convert an image modulated light beam into an achromatic focused beam spot which moves repeatedly in a first scan direction and over a range of scan angles to provide a highly resolved image comprising
   a first lens having a negative power,
   a second lens having a positive power, and
   a third lens having a positive power,
   wherein said first, second and third lenses are arranged in the order from object to image side and satisfy the following formulae (1) to (6)

$$-3.6 < \phi_1 < -3.0 \quad (1)$$
$$1.6 < \phi_2 < 2.0 \quad (2)$$
$$1.5 < \phi_3 < 1.8 \quad (3)$$
$$v_1 < 34 \quad (4)$$
$$44 < v_2 < 61 \quad (5)$$
$$37 < v_3 < 51 \quad (6)$$

where $\phi_n$ is the power of the $n^{th}$ lens with respect to the total power of the lens assembly and $v_n$ represents the Abbe dispersion number of the $n^{th}$ lens.

11. The lens assembly of claim 10 configured to produce an achromatic focused beam spot in the visible and near infrared spectral wavelength range.

12. The lens assembly of claim 10 configured to produce an achromatic focused beam spot in the spectral wavelength range of 670 nm to 780 nm.

13. The lens assembly of claim 10 wherein said range of scan angles spans −32° to +32°.

14. The lens assembly of claim 10 wherein
   said first lens has a refractive index in the range of 1.64 to 1.85,
   said second lens has a refractive index in the range of 1.60 to 1.75, and
   said third lens has a refractive index in the range of 1.65 to 1.75.

15. A high-speed flat field image printing apparatus comprising:
   a plurality of light sources responsive to an image modulated signal and producing a plurality of image modulated light beams having a plurality of wavelengths;
   a beam deflector supported for rotary motion to deflect said plurality of image modulated light beams onto an image recording medium in response to said rotary motion; and a lens assembly configured to convert said plurality of deflected image modulated light beams into a plurality of achromatic focused beam spots which move repeatedly in a first scan direction and over a range of scan angles to provide a highly resolved printed image across said recording medium.

16. The apparatus of claim 15 wherein said lens assembly is configured to produce a plurality of achromatic focused beam spots having wavelengths in the visible and near infrared spectral wavelength range.

17. The apparatus of claim 15 wherein said lens assembly is configured to produce a plurality of achromatic focused beam spots having wavelengths in the range of 670 nm to 780 nm.

18. The apparatus of claim 15 wherein said range of scan angles spans −32° to +32°.

19. A high-speed flat field image printing apparatus comprising:

a plurality of light sources responsive to an image modulated signal and producing a plurality of image modulated light beams having a plurality of wavelengths;

a beam deflector supported for rotary motion to deflect said plurality of image modulated light beams onto an image recording medium in response to said rotary motion; and a lens assembly configured to convert said plurality of deflected image modulated light beams into a plurality of achromatic focused beam spots which move repeatedly in a first scan direction and over a range of scan angles to provide a highly resolved printed image across said recording medium, wherein said lens assembly comprises
a first lens having a negative power,
a second lens having a positive power, and
a third lens having a positive power,
wherein said first, second and third lenses are arranged in the order from the object to the image side and satisfy the following formulae (1) to (6)

$$-3.6 < c_1 < -3.0 \quad (1)$$

$$1.6 < c_2 < 2.0 \quad (2)$$

$$1.5 < c_3 < 1.8 \quad (3)$$

$$v_1 < 34 \quad (4)$$

$$44 < v_2 < 61 \quad (5)$$

$$37 < v_3 < 51 \quad (6)$$

where $c_n$ is the power of the $n^{th}$ lens with respect to the total power of the lens assembly and $v_n$ represents the Abbe dispersion number of the $n^{th}$ lens.

20. A high-speed flat field image printing apparatus comprising:

a plurality of light sources responsive to an image modulated signal and producing a plurality of image modulated light beams having a plurality of wavelengths;

a beam deflector supported for rotary motion to deflect said plurality of image modulated light beams onto an image recording medium in response to said rotary motion; and a lens assembly configured to convert said plurality of deflected image modulated light beams into a plurality of achromatic focused beam spots which move repeatedly in a first scan direction and over a range of scan angles to provide a highly resolved printed image across said recording medium, wherein said lens assembly comprises
a first lens having a negative power and a refractive index in the range of 1.64 to 1.85
a second lens having a positive power and a refractive index in the range of 1.60 to 1.75, and
a third lens having a positive power and a refractive index in the range of 1.65 to 1.75,
wherein said first, second and third lenses are arranged in the order from the object to the image side.

21. A flat field image printing apparatus comprising:

a light source responsive to an image modulated signal and producing an image modulated light beam;

a beam deflector supported for rotary motion to deflect said image modulated light beam onto an image recording medium in response to said rotary motion; and a f-theta lens assembly configured to convert said deflected image modulated light beam into an achromatic focused beam spot which moves repeatedly in a first scan direction and over a range of scan angles to provide a highly resolved printed image across said recording medium, wherein said f-theta lens assembly is configured to produce an achromatic focused beam spot over a range of wavelengths in the visible and near infrared spectral wavelength range.

22. The apparatus of claim 21 wherein said f-theta lens assembly is configured to produce an achromatic focused beam spot in the spectral wavelength range of 670 nm to 780 nm.

\* \* \* \* \*